(12) United States Patent
Ross, Jr.

(10) Patent No.: US 6,639,199 B1
(45) Date of Patent: Oct. 28, 2003

(54) SEAFOOD MICROWAVE COOKER

(76) Inventor: Samuel R. Ross, Jr., 100 Kings Hwy., Haddon Hts, NJ (US) 08035

( * ) Notice: Subject to any disclaimer, the term of this patent is extended or adjusted under 35 U.S.C. 154(b) by 0 days.

(21) Appl. No.: 09/901,006

(22) Filed: Jul. 10, 2001

(51) Int. Cl.[7] .................................................. H05B 6/80
(52) U.S. Cl. ................. 219/735; 219/732; 99/DIG. 14; 426/118; 426/243; 229/902
(58) Field of Search ........................ 219/732, 733, 219/734, 735, 725, 762; 99/DIG. 14; 426/113, 118, 234, 241, 243; 229/902, 903

(56) References Cited

U.S. PATENT DOCUMENTS

| | | | |
|---|---|---|---|
| 4,286,136 A | 8/1981 | Mason, Jr. ............... 219/10.55 |
| 4,941,401 A | * 7/1990 | Sarnoff et al. ............... 219/734 |
| 5,012,971 A | * 5/1991 | Cozzi et al. ............ 229/120.07 |
| 5,026,958 A | * 6/1991 | Palacios ...................... 219/734 |
| 5,278,376 A | 1/1994 | Cyr ............................. 219/734 |
| 5,300,748 A | * 4/1994 | Colombo ..................... 219/734 |
| 5,352,465 A | * 10/1994 | Gondek et al. ............. 426/113 |
| 5,521,361 A | * 5/1996 | Strait, Jr. .................... 219/734 |
| 5,543,606 A | * 8/1996 | Gics ............................ 219/730 |
| 5,827,554 A | 10/1998 | Guarino ....................... 426/107 |
| 5,863,576 A | 1/1999 | Guarino ....................... 427/107 |
| D416,751 S | 11/1999 | Sawyer et al. ................ D7/359 |
| 6,187,354 B1 | 2/2001 | Hopkins ...................... 426/234 |

* cited by examiner

*Primary Examiner*—Philip H. Leung
(74) *Attorney, Agent, or Firm*—Blank Rome LLP

(57) ABSTRACT

The present invention is directed to a microwavable container for cooking various food article, particularly seafood such as shrimp, lobsters, king crab legs, mussels, clams, and fillets of fish. The container is made of a single piece of molded plastic having a top portion and a bottom portion of approximately equal dimensions. The top and bottom portions have a surface and continuous walls extending from the surface. Around the edges of each wall is a flange, one side of which forms a hinge. The hinge is dimensioned to create a gap between the top portion and bottom portion when the container is closed to vent excess steam generated during cooking. The flange also includes an attachment means for securing the top and bottom portions together in a closed position. The bottom surface and walls of the container include raised ridges and ribs creating passageways allowing steam to circulate around the food articles, enhancing the cooking of seafood in a microwave oven. The top portion defines an empty space which retains moisture produced during cooking or heating of food articles.

10 Claims, 4 Drawing Sheets

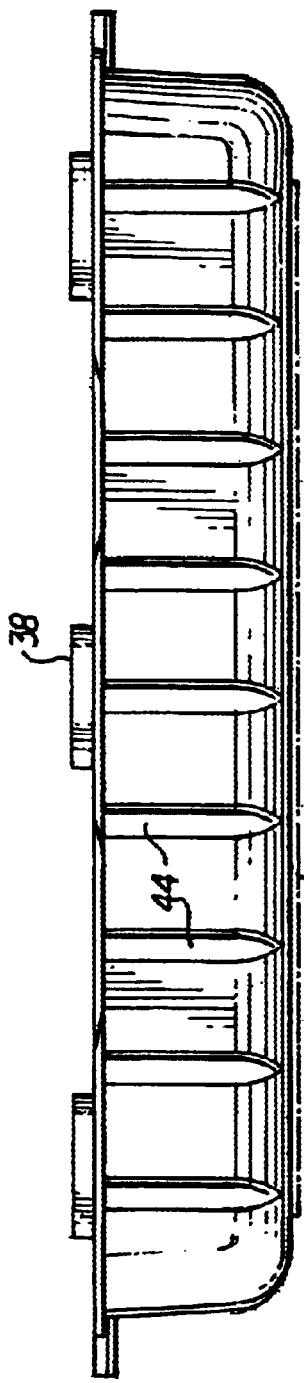
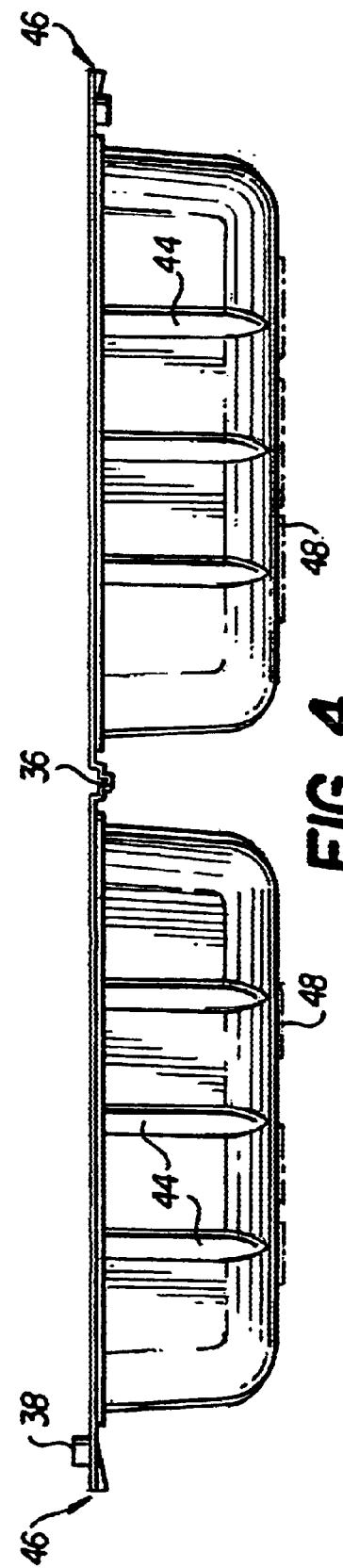

SEAFOOD MICROWAVE COOKER

BACKGROUND OF THE INVENTION

1. Field of the Invention

The invention is directed to a closable plastic container having a top portion and bottom portion of approximately equal dimensions, and ridges along its cooking surface for microwaving various food articles, particularly seafood such as shrimp, lobsters, king crab legs, mussels, clams and fillets of fish.

2. Description of Prior Art

Microwave ovens provide a quick and simple means of cooking and heating food in a short period of time. For this reason, they have become a popular cooking tool for people who do not have time to cook by conventional means. However, microwave ovens often leave the food article dry and tough in texture, and without the consistency found when using conventional methods. Furthermore, microwave ovens tend to heat food articles unevenly, overcooking some portions, while leaving other portions undercooked. These problems become more apparent when cooking seafood because of the sensitivity of the food.

U.S. Pat. No. 5,278,376 to Cyr discloses a microwavable lobster-shaped container for cooking lobsters. The container is specifically shaped to hold lobsters and so lacks the versatility to hold other, dissimilar-shaped seafood efficiently.

U.S. Pat. No. 4,286,136 to Mason, Jr. discloses a food container that is placed into a microwave oven in a vertical upright position which helps food articles contained therein to absorb microwave energy. A plastic film is placed over the top of the container to seal its contents when microwaving. After the food is cooked, the container is turned horizontally, where a bottom surface with ridges support the food above a series of channels which trap drippings from the food. The ridges also increase the structural strength of the container.

U.S. Pat. No. 6,187,354 to Hopkins discloses a microwavable steaming tray for cooking food articles. The container has a bottom surface with ridges defining steam channels to help to cook the food. The top portion of the container is a generally flat cover that is hinged along one side to the bottom portion of the container. Circular shaped vents are provided around the perimeter of the container to allow excess steam to escape.

U.S. Design Pat. No. Des. 416,751 to Sawyer et al. discloses a fish steaming tray having ridges in its bottom portion. The container's top portion is a generally flat cover hinged to the bottom portion along one side.

None of the prior art shows a container with a top portion having approximately the same dimensions as a bottom portion, and defining a space therein to retain steam, nor do they show a container having a bottom surface and walls with ridges to improve the circulation of steam around a food article. Furthermore, none of the prior art shows a container having a hinge which creates a gap between the top portion and bottom portion to vent excess steam.

SUMMARY OF THE INVENTION

Accordingly, it is an object of this invention to provide a microwavable cooking container that uniformly cooks food articles, eliminating the simultaneous overcooking and undercooking of the food articles. It is a further object of this invention to provide a container that retains the moisture of the food articles. It is still a further object of this invention to provide a microwavable cooking container that vents excess steam and overcomes other problems attendant with the prior art.

To achieve these and other objects, the present invention is directed towards a microwavable container for cooking various food articles, particularly seafood such as shrimp, lobsters, king crab legs, mussels, clams and fillets of fish. The container is made of a single piece of molded plastic having a top portion and a bottom portion of approximately equal dimensions, with the top and bottom portions having a top and bottom surface and continuous walls extending from the surfaces.

In a preferred embodiment, the surfaces on the top and bottom portions are generally rectangular-shaped with four continuous walls extending therefrom. Around the edge of each wall is a flange. The flanges are attached along a rear portion of the container to form a hinge between the top and bottom portion. The flanges include an attachment means for securing the top and bottom portions together in a closed position, at a point, preferably, opposite the hinge. The hinge is sized so that when the container is closed, portions of the flanges between the hinge and the attachment means provide a small gap to allow steam to exit the container.

The bottom surface of the container includes raised ridges for holding food above its base surface, which enhances the cooking of food in a microwave oven. Because the top portion is generally empty during cooking, it provides an empty volume above the food to retain moisture produced during heating for steam cooking the food article. The plastic material used to form the container can be any of the well known, thermoformable plastics that can be subjected to microwaves, and the heat generated by microwave cooking without substantial deformation.

BRIEF DESCRIPTION OF THE DRAWINGS

FIG. 3 is a front side view of the top portion of the container of FIG. 1;

FIG. 4 is a side view of the top and bottom portions of the container of FIG. 1 in its open position.

DETAILED DESCRIPTION OF THE INVENTION

Figure 1:
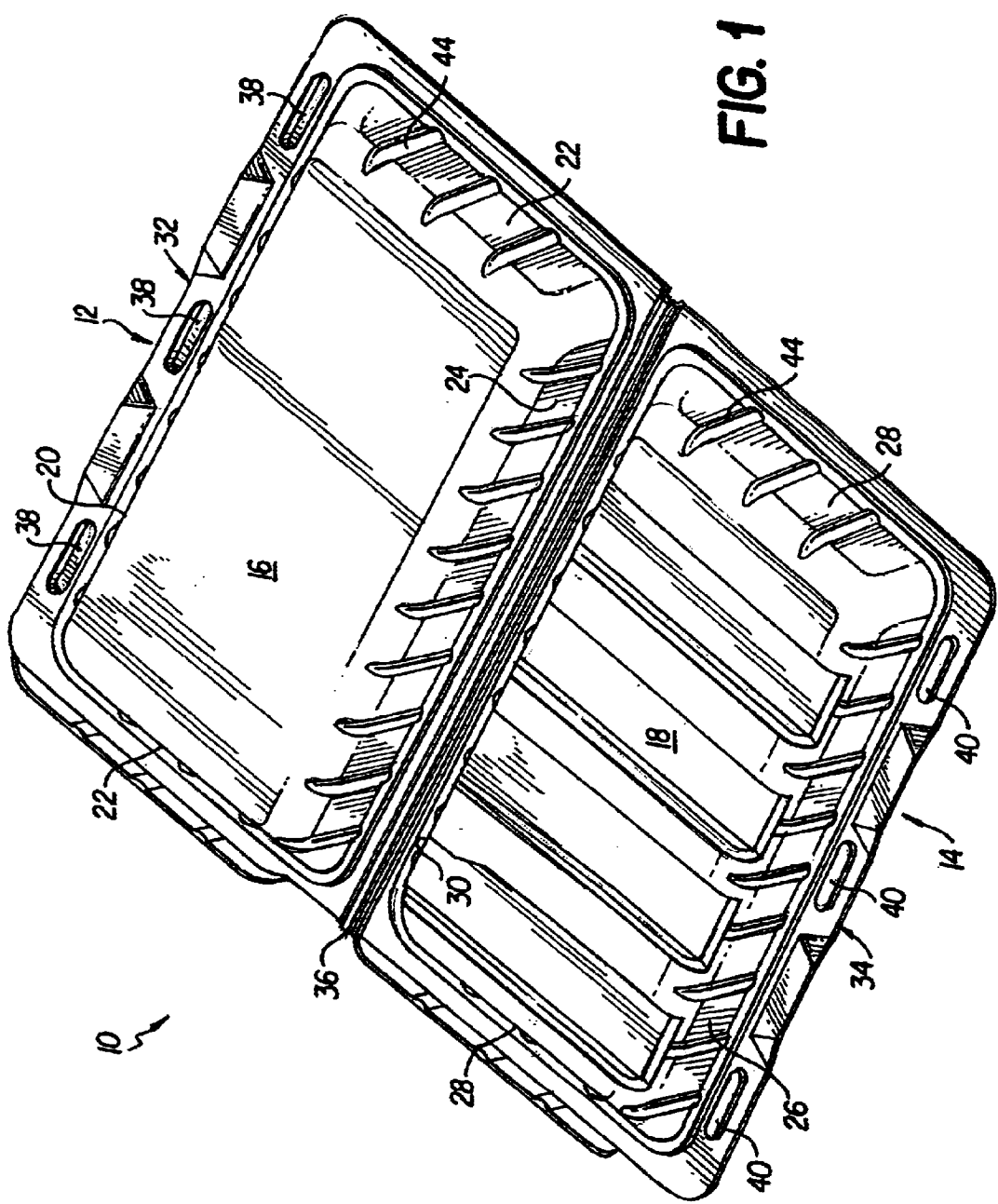
FIG. 1 is a perspective view of the outside of a microwavable container in its open position.

Referring now in detail to the drawings, FIG. 1 shows the outside of the microwavable container 10 in its open position. The container 10 comprises a top portion 12 and a bottom portion 14, which, in the preferred embodiment illustrated, are rectangular-shaped and approximately the same dimensions. The top portion 12 has a top surface 16, and the bottom portion 14 has a bottom surface 18, with walls extending therefrom. The walls for the top portion 12 comprise a front wall 20, two sidewalls 22 and a rear wall 24. Similarly, the walls for the bottom portion 14 comprise a front wall 26, two sidewalls 28 and a rear wall 30. Along the wall edges of the top and bottom portions are a top flange 32, and a bottom flange 34. The flanges 32 and 34 along the rear of the container 10 are attached to form a hinge 36 about which the top and bottom portions 12 and 14 rotate to open and close.

Figure 5:
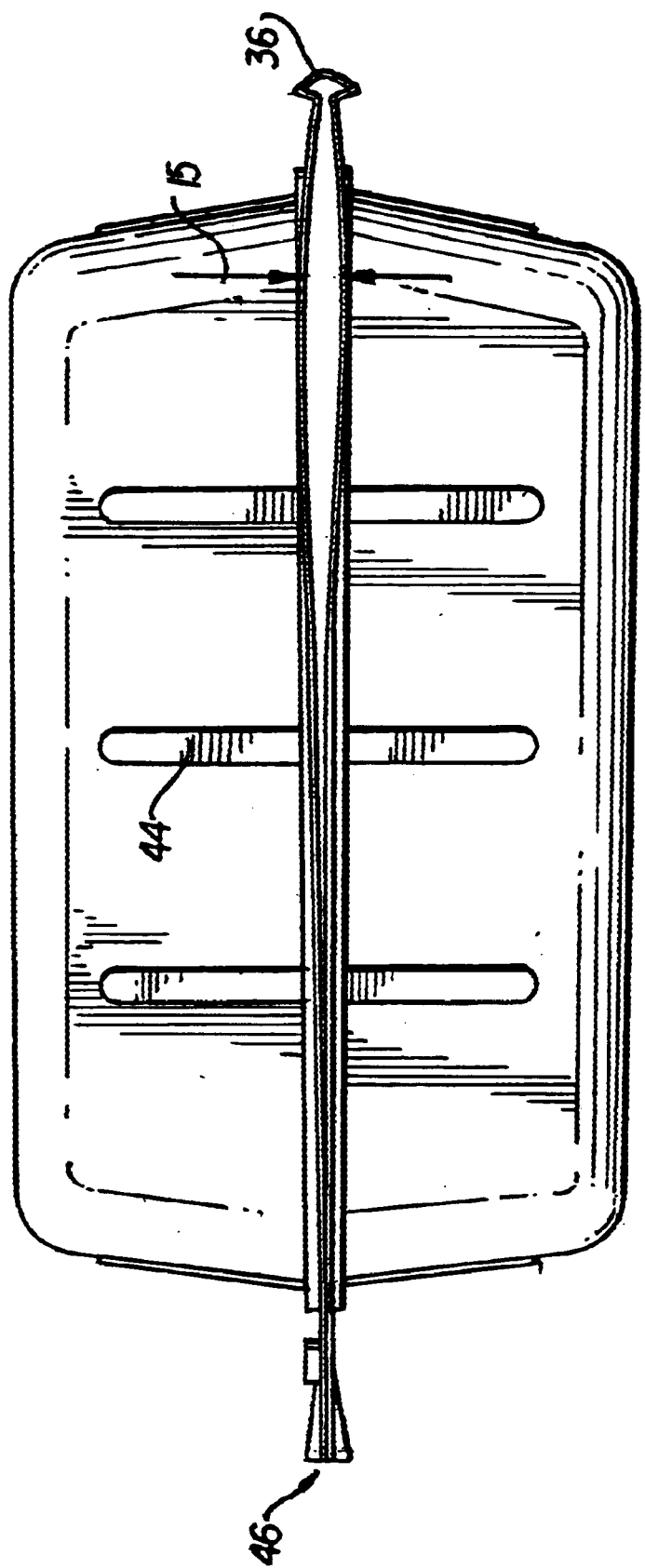
FIG. 5 is a side view of the top and bottom portions of the container of FIG. 1 in its closed position.

FIG. 5 shows the container in a closed position. The hinge 36 is sized so that when the container is closed, a small gap 15, preferably not exceeding a ¼ inch, is provided in the sides of the container between the top and bottom flanges 32, 34. The gap 15 provides a vent for steam to exit the container. In the preferred embodiment depicted in FIG. 5, the hinge 36 is formed from a continuous piece of the container joining the top and bottom flanges 32, 34 which is molded in such a way as to create the gap 15 between the top and bottom flanges 32, 34 in the sides of the container when closed.

Figure 2:
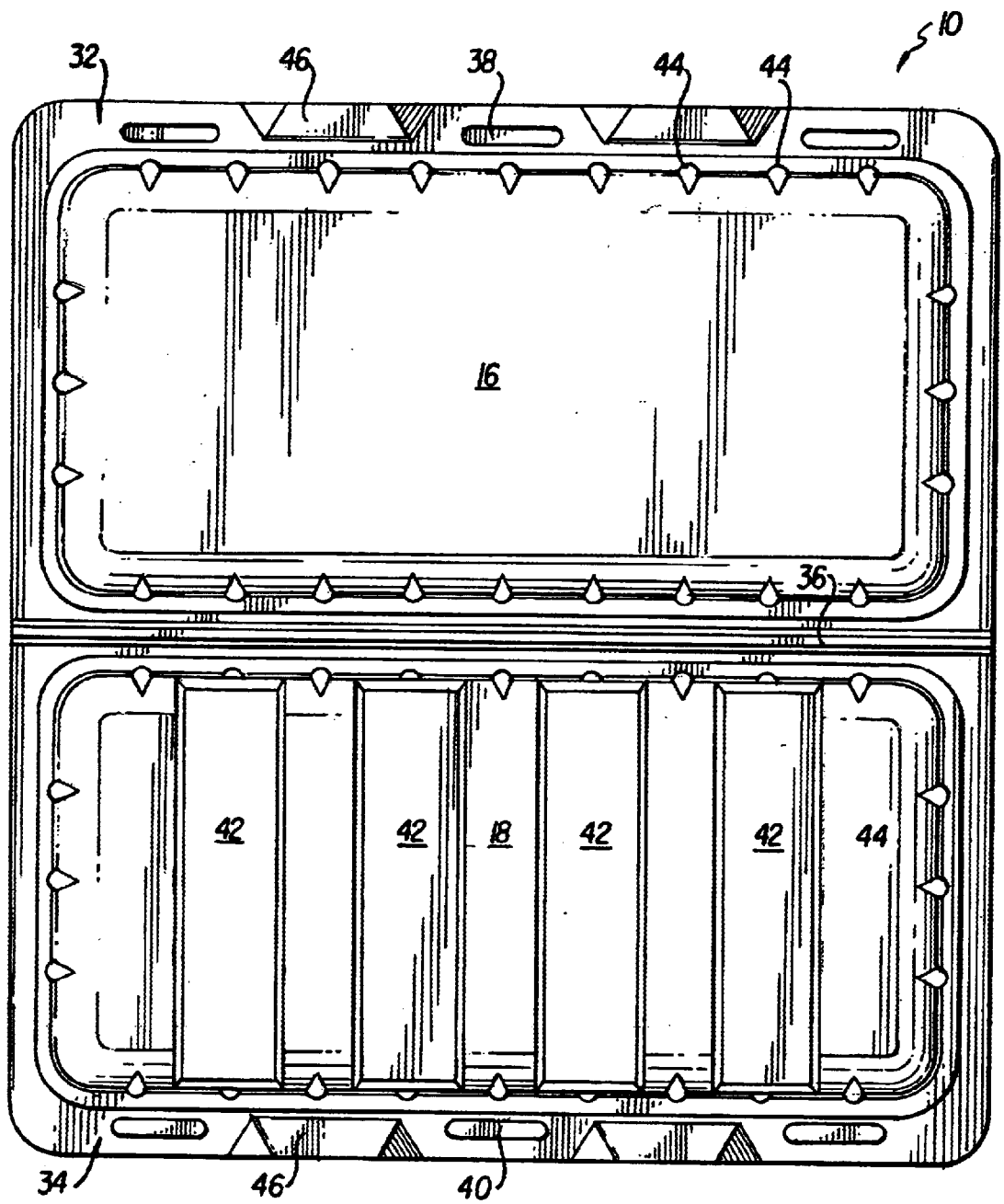
FIG. 2 is a top view of the inside of the container of FIG. 1 in its open position.

Opposite the hinge 36 is an attachment means comprising a series of depressions 40 on the bottom flange 34 for receiving a series of projections 38 on the top flange 32 of the container. The dimensions of the projections 38 are slightly larger than the dimensions of the depressions 40, so that when the container is closed, the projections 38 engage the depressions 40 to maintain the container in its closed position. FIGS. 1 and 2 show the projections 38 and depressions 40 placed on a forward portion of the flanges 32 and 34, but it is understood that they can also be placed on the sides of the flanges as well.

FIG. 2 shows the inside of the container in its open position. The bottom surface 18 of the container has several raised ridges 42 extending up from the base of the bottom surface 18 into the container. The ridges 42 are generally, uniformly spaced apart, creating valleys in between. When food items are placed into the container, they are placed onto the ridges 42 which support them above the base of the bottom surface 18. Additionally, the walls of the top portion 20, 22, and 24 and bottom portion 26, 28, and 30 include vertical raised ribs 44 protruding outwardly of the container. The ridges 42 and ribs 44 allow steam to circulate around the food articles and providing a more uniform and even cooking of the food articles. Also, the ridges 42 and ribs 44 provide increased structural rigidity to the container.

Raised lips 46 are provided on a forward portion of the flanges 32 and 34 for both the top and bottom portions of the container 10. As shown in the preferred embodiment, the lips 46 are generally rectangular-shaped portions of the flanges 32 and 34, rotated slightly so as to be non-planar with the flanges 32 and 34, as seen in FIG. 4. The lips 46 are rotated away from the opposing portion of the container, so that when the container is closed, the lips create a gap between the flanges 32 and 34 of the top portion 12 and bottom portion 14. The lips 46 provide a grip for grasping the flanges 32 and 34 and opening the container from its closed to open position.

An alternative embodiment of the grasping feature for the container is to provide semi-circular cutouts in the flanges 32 and 34 for grabbing the flanges. The cutouts in the top flange 32 are offset from the cutouts in the bottom flange 34 so that a portion of the bottom flange 34 extends into the top flange cutout and vice versa. In this way, the flange 32 or 34 of either the top portion 12 or the bottom portion 14 may be grasped to separate the two portions from one another.

When the container is closed, the top portion 12 of the container defines an empty volume or space that retains moisture produced during the cooking/heating process for steam cooking the food articles. The space helps to maintain the moisture of the food articles and produces a more uniform heating. The gap 15 in the sides of the container allow excess steam to escape preventing the food articles from being overcooked. Additionally, the gap 15 keeps the container from becoming over pressurized and exploding.

The preferred embodiment of the container is made from a unitary food-grade thermal-molded plastic material. The plastic material may be transparent or opaque, but should be clear enough so that the food article inside the container may be observed. Alternatively, a transparent window can be incorporated into an opaque container.

FIGS. 3 and 4 show emblems or lettering 48 that may be molded onto the surfaces of the container 10 during its manufacturing. The emblem or lettering 48 may be the name of a company, or other descriptive name or symbol associated with the container.

The microwavable cooking container described herein provides several advantages not found in the prior art. The top portion of the container defines an empty volume or space that retains steam and moisture released by the food articles. The top portion 12 is dimensioned approximately equal to the bottom portion 14, and this division of space between the top portion and bottom portion ensures that the empty space in the top portion remains unoccupied by food articles and its ability to retain steam is not impeded. Furthermore, the ridges 42 in the bottom surface 18 and the ribs 44 in the walls of the container allow steam to circulate around the food articles contacting the bottom surface and walls to ensure that the food articles are cooked uniformly in the container.

Although certain preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A single piece thermal-molded plastic container for microwaving food articles comprising:

a top portion and a bottom portion of approximately equal dimensions, said top portion having a top surface with walls extending therefrom and a bottom portion having a bottom surface with walls extending therefrom;

a top flange along the edges of the walls of the top portion and a bottom flange along the edges of walls of the bottom portion, wherein a side of the top flange and a corresponding side of the bottom flange form a hinge about which the top portion and bottom portion of the container rotate;

said bottom surface having raised ridges for supporting food article placed into the container;

said top portion defining a space for holding moisture released during the heating of food articles within the contaier; means for holding the container in a closed position and means for maintaining a gap between the top flange and the bottom flange when the container is in a closed position to allow steam to exit.

2. The thermal-molded plastic container for microwaving food articles of claim 1, wherein:

said walls of said top surface and said bottom surface include raised ribs protruding from said walls.

3. The thermal-molded plastic container for microwaving food articles of claim 1, wherein wherein said means for holding the container in a closed position including one of one or more projections and depressions on said top flange and said bottom flange for engagement.

4. The thermal-molded plastic container for microwaving food articles of claim 1, wherein:

the container is molded from a single piece of plastic material containing descriptive indicia on said top and bottom surfaces.

5. The thermal-molded plastic container for microwaving food articles of claim 1, wherein:

the food articles are seafood.

6. A plastic container for microwaving food articles comprising:

a top portion and a bottom portion of approximately equal dimensions, said top portion having a top surface with walls extending therefrom and a bottom portion having a bottom surface with walls extending therefrom, wherein said bottom surface has raised ridges for supporting food article placed into the container and said walls extending from said top surface and said bottom surface include raised ribs protruding from said walls;

a top flange along the edges of said top wall and an bottom flange along the edges of said bottom wall, wherein one side of the top flange and a corresponding side of the bottom flange form a hinge about which the top portion and bottom portion of the container rotate; means for holding the container in a closed position and means for maintaining a gap between the top flange and the bottom flange when the container is in a closed position to allow steam to exit.

7. The plastic container for microwaving food articles of claim 6, wherein:

said top portion of the container defines a space for retaining moisture released during the heating of food articles within the container.

8. The plastic container for microwaving food articles of claim 7, wherein said means for holding the container in a closed position including one of one or more projections and depressions on said top flange and said bottom flange for engagement.

9. The plastic container for microwaving food articles of claim 8, wherein:

the food articles are shellfish.

10. The plastic container for microwaving food articles of claim 9, wherein:

the container is molded from a single piece of plastic material containing descriptive indicia on said top and bottom surfaces.

\* \* \* \* \*